United States Patent [19]

Rumpf

[11] Patent Number: 4,729,525

[45] Date of Patent: Mar. 8, 1988

[54] SEAT BELT RETRACTOR WITH ELECTRICALLY ACTUATABLE LOCKING MECHANISM

[75] Inventor: Robert J. Rumpf, Grosse Pointe, Mich.

[73] Assignee: TRW Vehicle Safety Systems Inc., Lyndhurst, Ohio

[21] Appl. No.: 941,091

[22] Filed: Dec. 12, 1986

[51] Int. Cl.$^4$ .................. B60R 22/38; B60R 22/40
[52] U.S. Cl. .................. 242/107.4 B; 242/107.4 A; 188/74; 188/161
[58] Field of Search ............... 242/107.4 A, 107.4 B, 242/107.4 R, 84.52 B; 188/74, 161, 162, 163; 280/806; 297/478

[56] References Cited

U.S. PATENT DOCUMENTS

| | | | |
|---|---|---|---|
| 2,588,837 | 3/1952 | Holm | 242/84.52 B |
| 2,600,685 | 6/1952 | Perinoni et al. | 242/84.52 B |
| 2,687,546 | 8/1954 | Oppenheimer | 188/74 X |
| 3,339,681 | 9/1967 | Holladay | 188/163 |
| 3,343,763 | 9/1967 | Spouge | 242/107.4 A |
| 3,552,676 | 1/1971 | Weber | 242/107.4 A |
| 3,825,205 | 7/1974 | Takada | 242/107.4 R |
| 3,967,794 | 7/1976 | Fohl | 242/107.4 B X |
| 3,995,787 | 12/1976 | Takada | 242/107.4 B |

FOREIGN PATENT DOCUMENTS 2215892 10/1973 Fed. Rep. of Germany .

*Primary Examiner*—John M. Jillions
*Attorney, Agent, or Firm*—Tarolli, Sundheim & Covell

[57] ABSTRACT

A seat belt retractor comprises a spool which is rotatable in seat belt winding and unwinding directions. An inertia member is rotatable with the spool at spool accelerations below a predetermined level and rotatable relative to the spool at spool accelerations above the predetermined level. The spool is blocked against from rotation in the unwinding direction in response to relative rotation of the inertia member and the spool. The inertia member is restrained from rotation to effect rotation relative to the spool by an electromagnet having opposite poles extending adjacent the inertia member. The electromagnet is energized to create a magnetic field extending through the poles to cause the poles to be attracted against the inertia member to restrain rotation of the inertia member.

21 Claims, 9 Drawing Figures

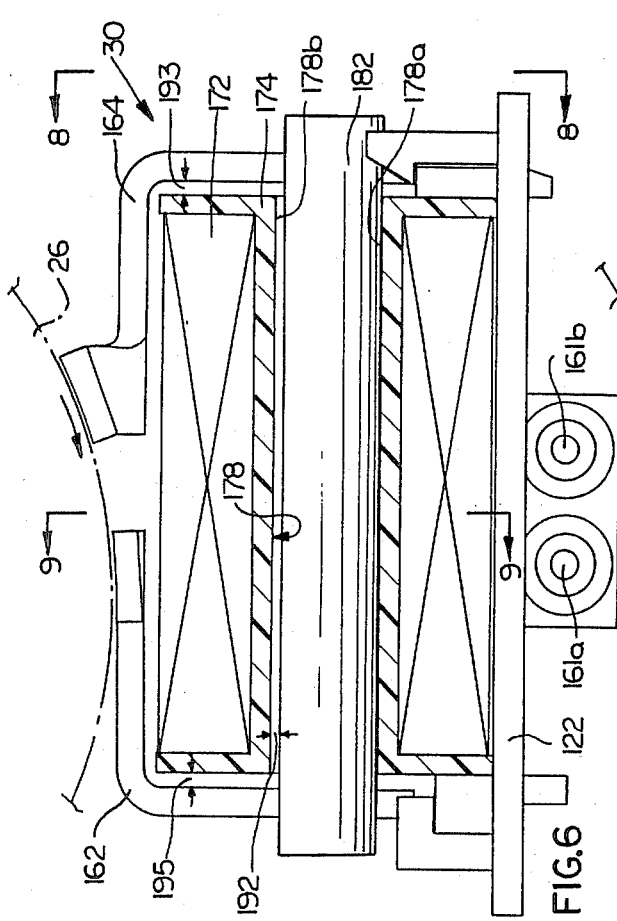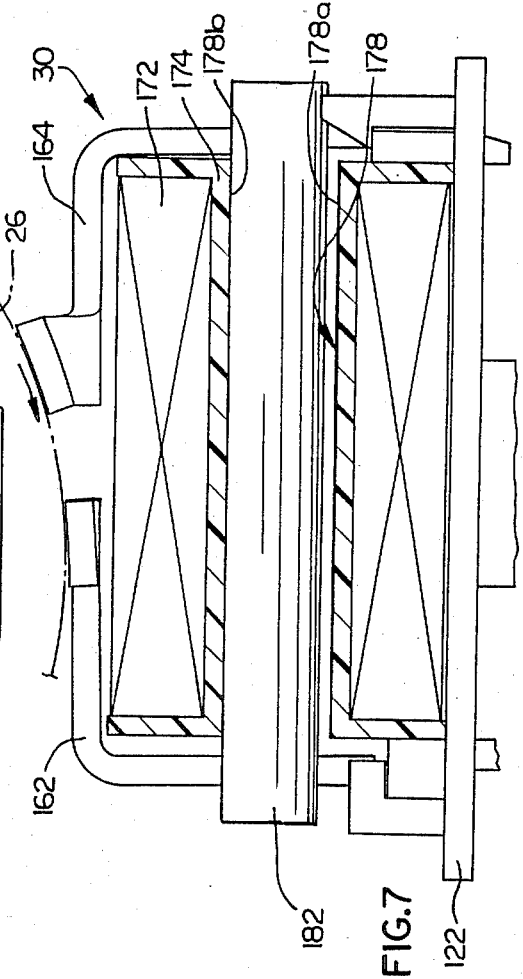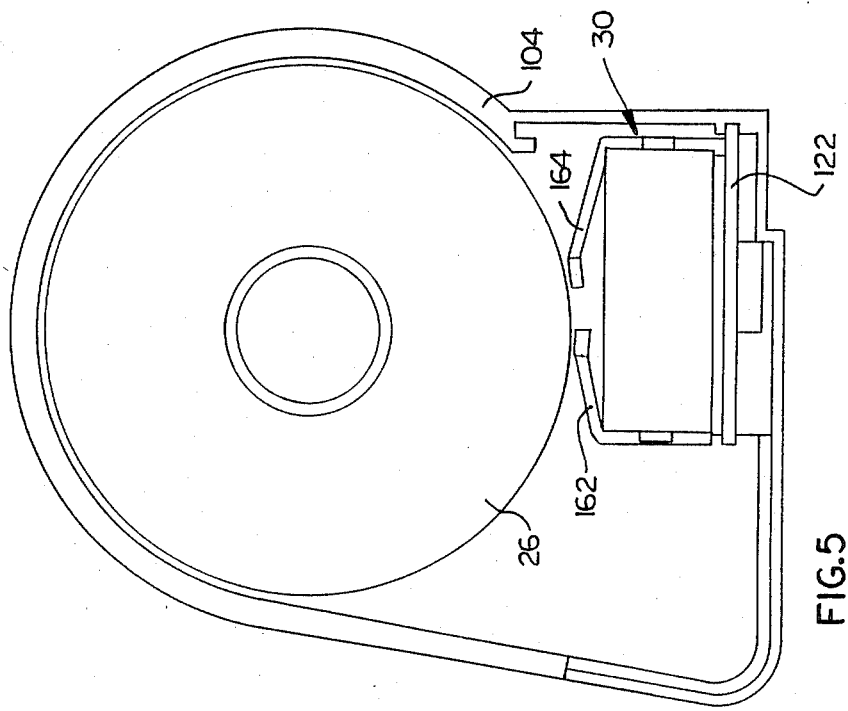

SEAT BELT RETRACTOR WITH ELECTRICALLY ACTUATABLE LOCKING MECHANISM

BACKGROUND OF THE INVENTION

1. Field of the Invention

The present invention relates to a seat belt retractor. More particularly, the present invention relates to an electrically actuatable locking mechanism which prevents seat belt webbing withdrawal from the retractor.

2. Description of the Prior Art

Seat belt retractors are known. One type of seat belt retractor is web-sensitive. A web-sensitive seat belt retractor has a locking mechanism which locks to prevent withdrawal of seat belt webbing in response to withdrawal of the belt webbing above a predetermined rate of acceleration which occurs in certain emergency situations. There are many known actuators for actuating the locking mechanism to prevent belt webbing withdrawal. Typically, the locking mechanism is actuated by relative rotation of the retractor spool on which the webbing is wound and an inertia member. In response to a predetermined amount of relative rotation therebetween, a pawl pivots into engagement with a ratchet wheel attached to the spool to prevent rotation of the spool and thus prevent further seat belt webbing withdrawal.

It is well known that to maximize occupant safety during an emergency situation, the seat belt webbing should be locked from withdrawal as quickly as possible after the start of the emergency situation in order to minimize the amount of occupant movement. This has resulted in the development of electrically actuated locking mechanisms.

German Published Application No. 2,402,748 discloses a web-sensitive retractor which includes an eddy current brake to slow rotation of an inertia member upon energization of an electrical coil disposed adjacent the inertia member. Slowing rotation of the inertia member results in relative rotation between the inertia member and a seat belt spool to effect actuation of a mechanical locking mechanism. Thus, the German Published application discloses an electrically actuatable seat belt retractor locking mechanism.

Several other retractors are known which have electrically actuatable locking mechanisms. One such retractor is disclosed in U.S. Pat. No. 3,825,205. In U.S. Pat. No. 3,825,205, an electric signal is generated by a sensor in response to an emergency situation, such as sudden vehicle deceleration. The electric signal is conducted to a solenoid which acts to move a pawl into engagement with a ratchet wheel connected to a spool. When the pawl engages the ratchet wheel, rotation of the spool is blocked and further withdrawal of the seat belt webbing from the spool is prevented. In German Published Application No. 2,215,892, friction brakes are brought into direct engagement with a seat belt spool upon electrical energization of a device for moving the brakes. The brakes stop the spool from rotating to prevent seat belt withdrawal therefrom.

SUMMARY OF THE INVENTION

The present invention is a seat belt retractor which has an electrically actuatable locking mechanism. The present invention includes an electromagnet which is energized in response to an emergency situation and which has poles disposed adjacent to a rotatable inertia member. Upon energization of the electromagnet, the poles are attracted against the inertia member to restrain rotation of the inertia member. The locking mechanism is actuated in response to relative rotation of the inertia member and the retractor spool.

In a preferred embodiment of the present invention, a seat belt retractor includes a spool which is rotatable in seat belt winding and unwinding directions. The inertia member is rotatable with the spool at spool accelerations below a predetermined level and rotatable relative to the spool at spool accelerations above the predetermined level. When the electromagnet is operated, rotation of the inertia member is restrained and the spool rotates relative to the inertia member. The electromagnet has opposite poles extending adjacent to the perimeter of the inertia member. The electromagnet, when energized, creates a magnetic field extending through the poles to cause the poles to be attracted against the inertia member to thereby frictionally restrain rotation of the inertia member.

The inertia member is formed of a magnetic permeable material and comprises a circular disk. The disk lies in a plane which is transverse to the axis about which the disk rotates. The electromagnet includes an electrically energizable coil having an opening therethrough. The electromagnet further includes a core which is disposed in the opening through the coil and which is movable relative thereto. One of the poles is connected with a first axial end portion of the core and the other of the poles is connected with a second axially opposite end portion of the core. Upon energization of the coil, the poles move from a first position spaced from the disk along a path in the plane containing the disk to a second position in frictional engagement with the circular perimeter of the disk to restrain the rotation of the disk.

BRIEF DESCRIPTION OF THE DRAWINGS

Further features of the present invention will become apparent to those skilled in the art to which the present invention relates from a reading of the following specification made with reference to the accompanying drawings, in which:

FIG. 5 is a view of a portion of the seat belt retractor of FIG. 2 taken approximately along line 5—5 of FIG. 2;

FIG. 6 is an enlarged side view of an electrically energizable actuator assembly of the seat belt retractor of FIG. 1;

FIG. 7 is a view of the actuator assembly similar to that of FIG. 6 and illustrating parts in a different position;

DESCRIPTION OF A PREFERRED EMBODIMENT

Figure 1:
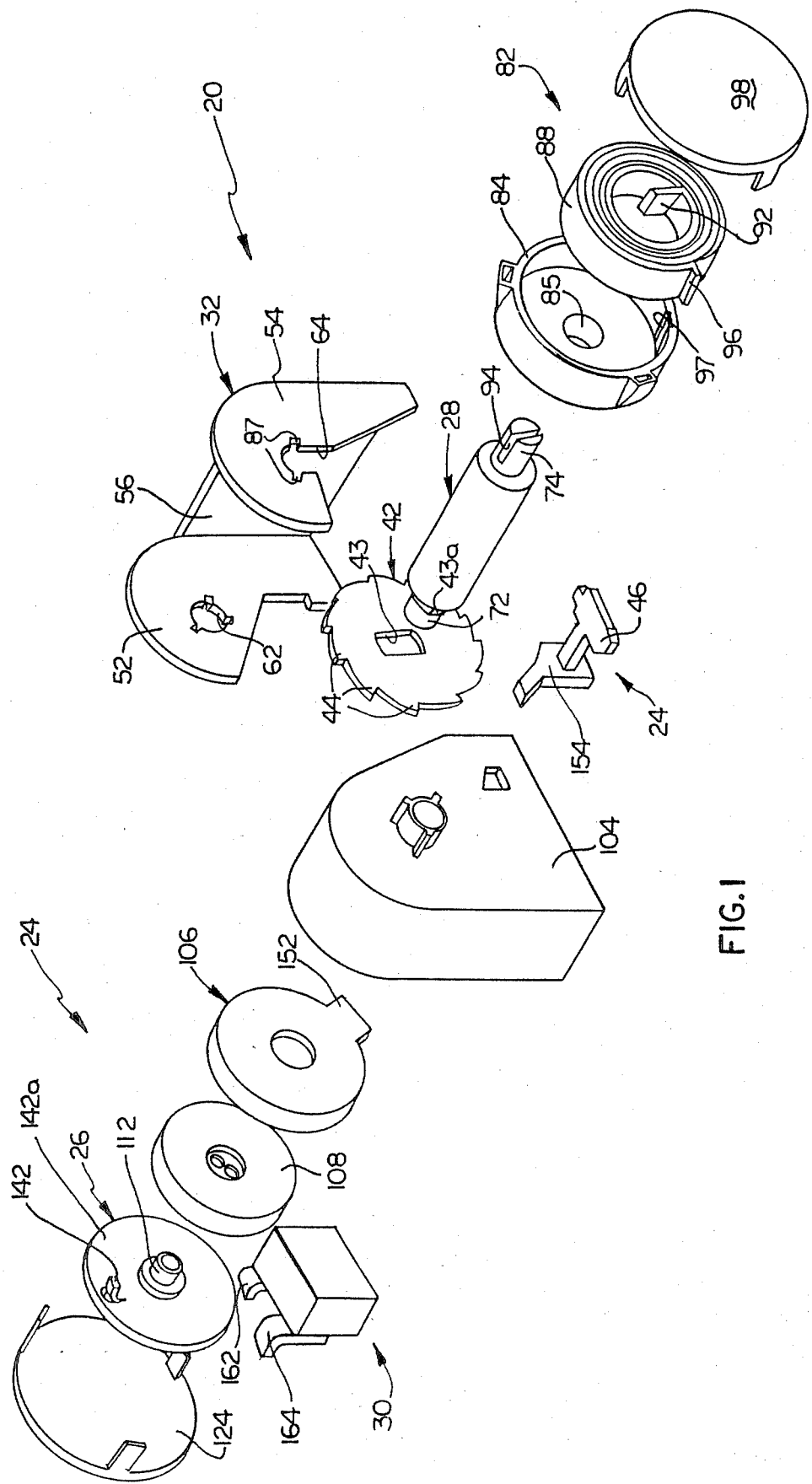
FIG. 1 is an exploded perspective view of a seat belt retractor embodying the present invention.
Figure 2:
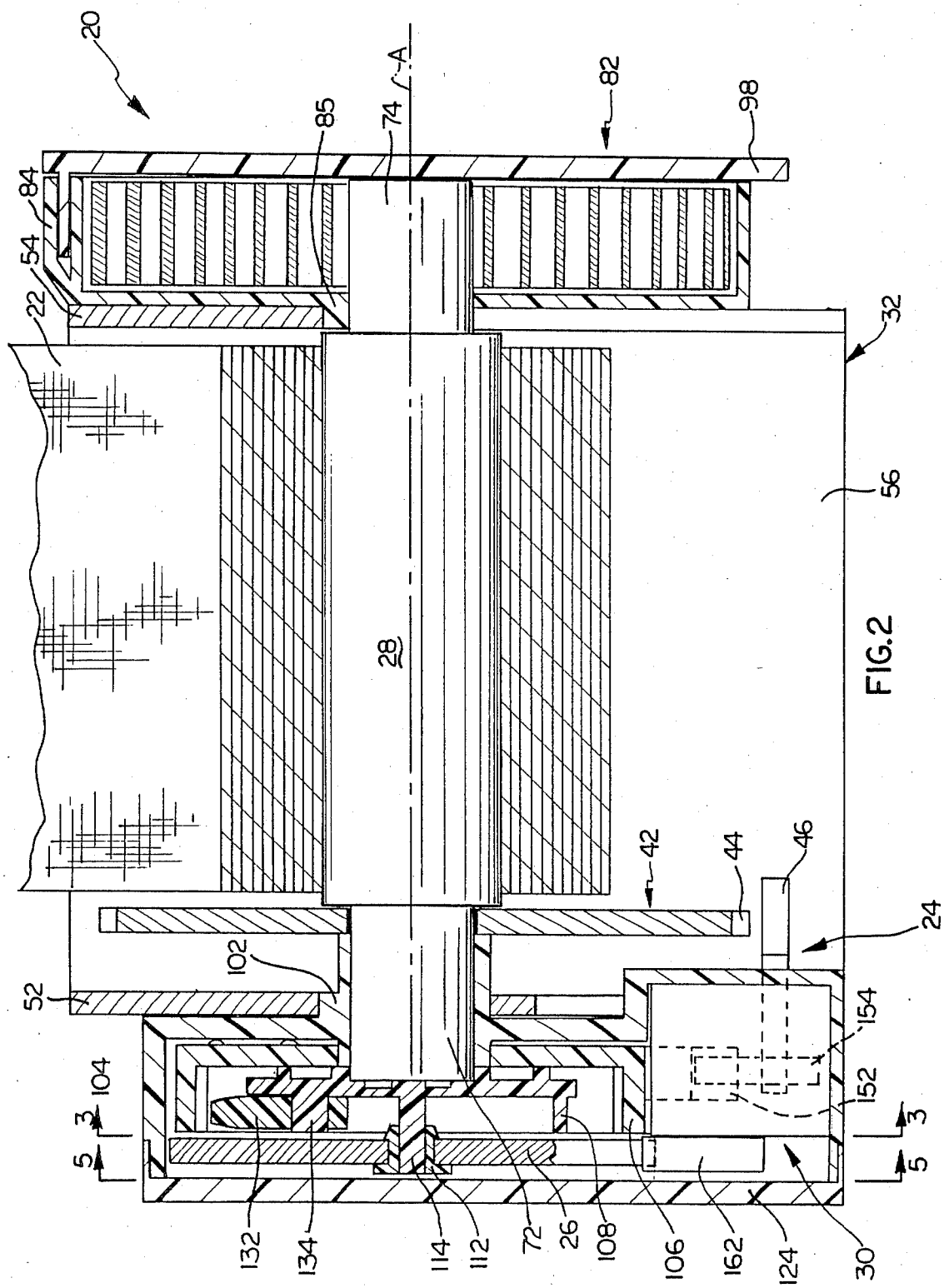
FIG. 2 is a cross sectional view of the seat belt retractor embodying the present invention.

A seat belt retractor 20 incorporating the present invention is illustrated in FIGS. 1 and 2. The seat belt retractor 20 is of the web-sensitive type, and thus seat belt webbing 22 is blocked from withdrawal from the retractor in response to belt withdrawal from the retractor at a rate of accleration above a predetermined rate. When the seat belt webbing 22 is withdrawn from the retractor 20 above the predetermined rate of acceleration, a locking mechanism 24 is actuated by rotation of an inertia member 26 relative to a spool 28 (spindle) on which the seat webbing 22 is wound. The seat belt retractor 20 also includes an electrically energizable actuator assembly 30 which, when actuated, actuates the locking mechanism 24.

The seat belt retractor 20 (FIG. 1) includes a frame 32 for supporting the spool 28 for rotation. The retractor frame 32 is connectible with a vehicle frame (not shown). An end portion of the seat belt webbing 22 is connected with the spool 28 and the seat belt webbing is wound about the spool 28. The spool 28 is supported for rotation about its longitudinal central axis A in a belt webbing withdrawal direction and an opposite belt webbing wind-up direction.

The locking mechanism 24 includes a ratchet wheel 42 fixedly connected to the spool 28 and thus is rotatable with the spool 28. The ratchet wheel 42 has a D-shaped opening 43 therein which is received on a mating D-shaped portion 43a of the spool 28. A plurality of teeth 44 are spaced about the periphery of the ratchet wheel 42. The frame 32 also supports a pawl 46 for movement into engagement with the teeth 44 of the ratchet wheel 42, as is known.

The frame 32 has a pair of sides 52, 54 integrally formed as one piece with and extending from a base portion 56. The frame side 52 has a circular opening 62 extending therethrough. The frame side 54 has a slot 64 extending to an edge of the frame side. During assembly of the seat belt retractor 20, the spool 28, with the ratchet wheel 42 connected thereto and the belt webbing 22 wound thereabout, is moved along the length of the slot 64. The spool 28 is then moved axially, and a first end portion 72 of the spool 28 is received in the circular opening 62. A second axial end portion 74 of the spool 28 is then supported by frame walls defining the slot 64.

A biasing spring assembly 82 urges rotation of the spool 28 in a seat belt retracting direction and winds the seat belt webbing 22 onto the spool 28. The biasing spring assembly 82 also serves to block the second axial end portion 74 of the spool 28 from movement along the slot 64 when the bias spring assembly is connected with the frame side 54. The bias spring assembly 82 includes a spring cup 84 which has portions received in openings 87 in the frame side 54 to prevent rotation of the spring cup relative to the frame side. Also, the spring cup 84 has a bearing portion 85 which receives and supports the end portion 74 of the spool 28 for rotation. Thus, when the spring cup 84 is connected with the frame side 54, the spool 28 is prevented from moving relative to the frame side 54 along the slot 64.

A spring 88 is disposed within the spring cup 84. The spring 88 has one end portion 92 received in a slot 94 in the end portion 74 of the spool 28. A second end portion 96 of the spring 88 is received in a slot 97 in the spring cup 84. Thus, the spring 88 is connected with the frame 32 and the spool 28 and biases the spool 28 in the belt retracting or winding direction. A spring cover 98 is then connected with the spring cup 84 to enclose the bias spring 88.

Received in the opening 62 of the frame side 52 is a portion 102 of a locking mechanism housing 104. A pilot sensor base 106 is disposed within the housing 104 and is rotatably supported by the end portion 72 of the spool 28. A pilot sensor 108 is disposed within the pilot sensor base 106 and is fixed to the end of the spool 28 and is rotatable therewith. The pilot sensor 108 is preferably made of a relatively lightweight plastic.

Figure 4:
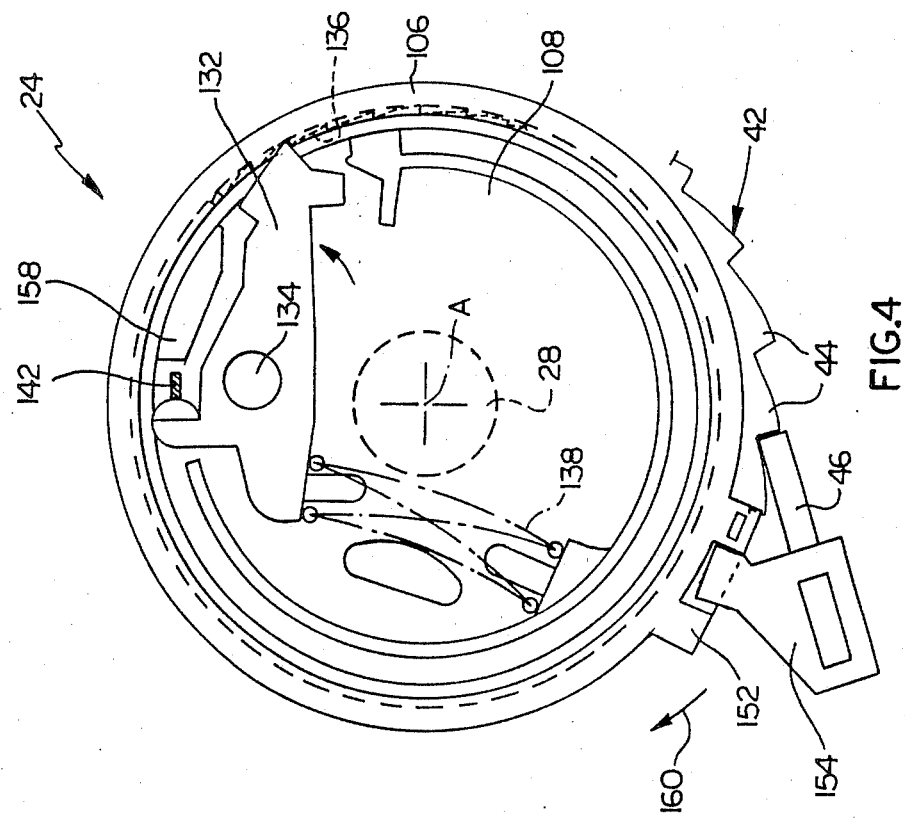
FIG. 4 is a view similar to that of FIG. 3 illustrating the parts in a different position.
Figure 3:
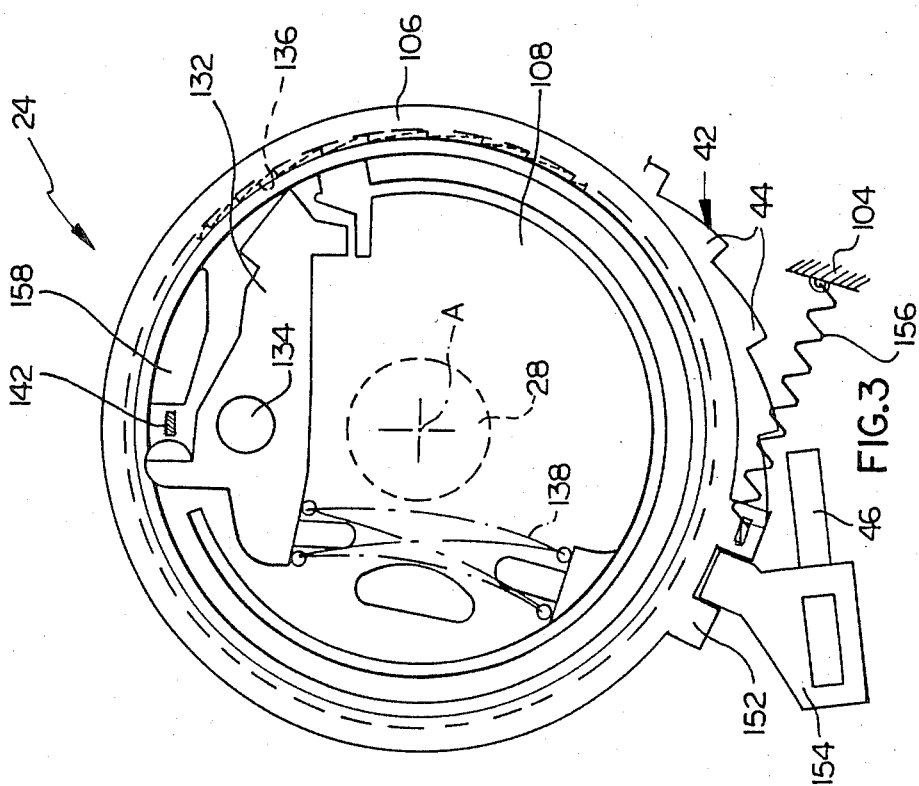
FIG. 3 is a view, taken approximately along the line 3—3 of FIG. 2 and with parts omitted.
Figure 8:
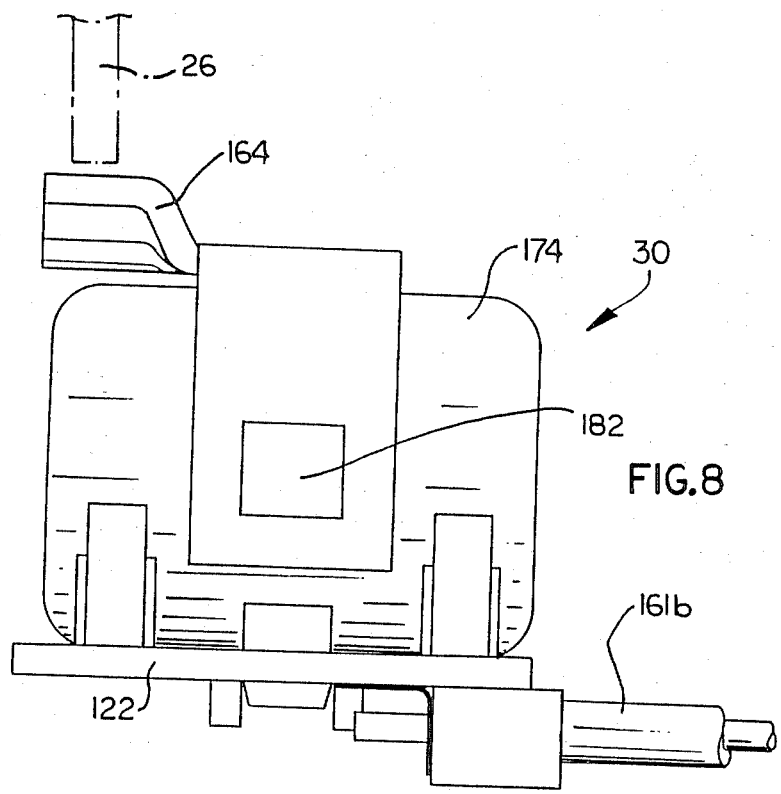
FIG. 8 is an end view of the actuator assembly of FIG. 6 taken approximately along the line 8—8 of FIG. 6.
Figure 9:
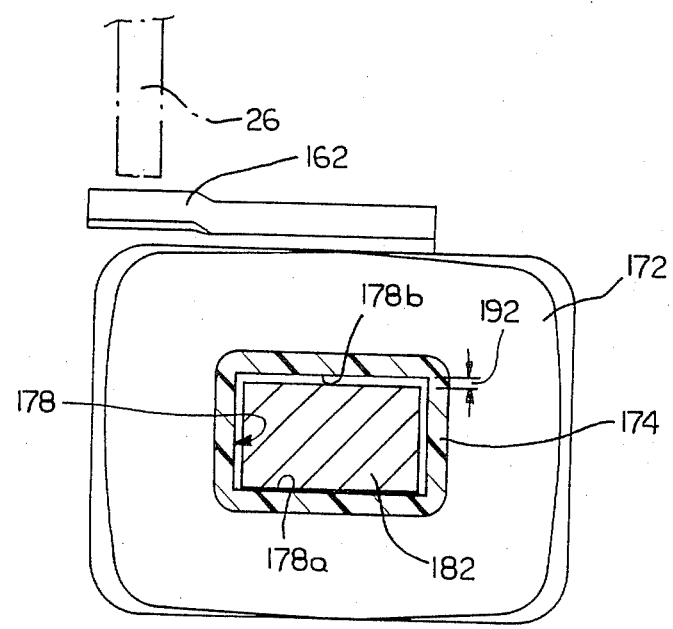
FIG. 9 is a cross sectional view of the actuator assembly of FIG. 6 taken approximately along the line 9—9 of FIG. 6.

The inertia member 26 is a circular disk and has a hub 112 extending therefrom. The hub 112 is received on a first stub shaft 114 of the pilot sensor 108. As best seen in FIGS. 3 and 4, a pilot sensor lever 132 is received on a second stub shaft 134 extending from the pilot sensor 108. The pilot sensor lever 132 is pivotal about the stub shaft 134. The pilot sensor lever 132 has an end portion which engages internal teeth 136 forming a ratchet wheel on an interior circumferential surface of the pilot sensor base 106. The pilot sensor lever 132 is normally biased away from engaging the teeth 136 by a spring 138. The pilot sensor base 106 has a projection 152 extending radially therefrom. A lever 154 has a portion received within an opening in the projection 152. The lever 154 is connected with the pawl 46. Upon a relatively small amount of rotation of the pilot sensor base 106 about the axis A, the projection 152 pivots about the axis A which causes the lever 154 to pivot. As illustrated in FIG. 4, the pawl 46 then moves into engagement with teeth 44 on the ratchet wheel 42. This engagement prevents the spool 28 from rotating and thus the seat belt webbing 22 from being withdrawn from the seat belt retractor 20. The pilot sensor base 106 is normally spring biased away from causing the pawl 46 to engage the ratchet wheel 42 by a spring 156.

The inertia member 26 has a projection 142 (FIGS. 3 and 4) extending axially from the inwardly facing surface 142a thereof into a space between the pilot sensor lever 132 and a portion 158 of the pilot sensor 108. The inertia member 26 will lag behind rotation of the pilot sensor 108 when the seat belt webbing 22 is withdrawn at a rate of acceleration above the predetermined rate of acceleration. Upon relative rotation of the inertia member 26 and the pilot sensor 108, the projection 142 will engage the pilot sensor lever 132 to pivot the pilot sensor lever about the shaft 134. The pilot sensor lever 132 will engage the teeth 136 of the pilot sensor bare 106, thereby locking it against rotation relative to the pilot sensor base 106. Thus, the inertia member 26, the pilot sensor 108, and the pilot sensor base 106 are mechanically locked together. This results in the pilot sensor base 106 rotating a slight amount, in the direction indicated by the arrow 160 (FIG. 4), about axis A due to the continued rotation of spool 28 and results in locking the retractor.

The electrically energizable actuator assembly 30 is illustrated in FIGS. 5-9. The actuator assembly 30 (FIG. 5) is supported by a base 122 within the housing 104. A cover 124 (FIGS. 1 and 2) is attached to the housing 104 and covers the components of the locking mechanism 24. The actuator assembly 30 has poles 162, 164 disposed adjacent to the perimeter of the inertia member 26. The inertia member 26 is supported for rotation about the axis A, and the inertia member 26 is disposed in a plane which extends perpendicular to the axis A. The inertia member 26, at least around its perimeter, is made of a material having a relatively high magnetic permeability.

The electrically energizable actuator assembly 30 also includes a wire coil 172 wound about a bobbin 174. The bobbin 174 is supported on the base 122. The bobbin 174 has a surface defining an opening 178 extending through the bobbin and thus the coil 172. An iron core 182 is disposed in the opening 178 and is supported by a surface 178a defining the opening 178. The poles 162, 164 are connected to axially opposite end portions of the iron core 182. A small clearance 192 normally exists between the top of the iron core 182 and the surface 178b of the bobbin 174. Also, clearance 193 exists between the pole 164 and one axial end of the bobbin 174. Another clearance 195 exists between pole 162 and the other axial end of the bobbin 174.

In response to a predetermined emergency situation, such as a collision or rapid deceleration of the vehicle, a known sensor (not shown) will generate an electric signal which is conducted by wires 161a, 161b to the electrically energizable actuator assembly or electromagnet 30. The coil 172 is energized by the electric signal to create a magnetic field in the iron core 182, poles 162, 164, and the inertia member 26. The iron core 182 is of a relatively low mass so that it may move relative to the coil 172 between the nonactuated position of FIG. 6 and the actuated position of FIG. 7. The clearances 192, 193 and 195 enable the poles 162, 164 and iron core 182 to move relative to bobbin 174.

The magnetic field attracts the poles 162, 164 against the inertia member 26. This magnetic attraction causes the poles 162, 164 and iron core 182 to move upwardly and to the left, from the position shown in FIG. 6, to the position shown in FIG. 7. The end portions of the poles 162, 164 are thus brought into frictional engagement with the outer circular perimeter of the inertia member 26. This slows the inertia member and causes relative rotation of the inertia member 26 and spool 28, effecting locking of the retractor 20, as described above.

The poles 162, 164 are normally spaced from the periphery of the inertia member 26. However, it is contemplated that the end portions of the poles 162, 164 could lightly contact the inertia member 26 during operation. However, a force sufficient to restrain rotation of the inertia member 26 will not be applied to the inertia member during this light contact. It is only when the coil 172 is actuated that the inertia member 26 is restrained from rotation. Restraining the inertia member 26 from rotation occurs preferably within 5 milliseconds after the sensor detects that an emergency situation exists.

From the above description of a preferred embodiment of the invention, those skilled in the art will perceive improvements, changes and modifications. Such improvements, changes and modifications within the skill of the art are intended to be covered by the appended claims.

Having described a preferred embodiment, I claim:

1. A seat belt retractor comprising:
a spool rotatable in seat belt winding and unwinding directions;
a member rotatable with said spool at spool accelerations below a predetermined level and rotatable relative to said spool at spool accelerations above the predetermined level;
locking means for locking said spool against rotation in the unwinding direction in response to relative rotation of said member and said spool; and
means for restraining rotation of said member to effect relative rotation of said member and said spool comprising
an electromagnet having opposite poles extending adjacent said member, and
means for energizing said electromagnet to create a magnetic field extending through said poles and said inertia member to cause said poles to be attracted against said member to restrain the rotation of said member.

2. A seat belt retractor as set forth in claim 1 wherein said poles have a first position spaced from said member and a second position against said member and further including means supporting said poles for movement between said positions upon energization of said electromagnet.

3. A seat belt retractor as set forth in claim 2 wherein said electromagnet includes an electrically energizeable coil, said means for supporting said poles for movement includes surface means defining an opening through said coil, and a core of the electromagnet disposed in the opening through said coil and movable therein, one of said poles being connected with a first axial end portion of said core and another of said poles being connected with a second axially opposite end portion of said core.

4. A seat belt retractor as set forth in claim 3 wherein said member is formed of a material having a relatively high magnetic permeability said member comprising a disk having a circular peripheral surface against which said poles are attracted, said disk lying in a plane which is transverse to the axis of rotation of said member.

5. A seat belt retractor as set forth in claim 4 wherein said core is movable within the opening through said coil so that said poles move in a path in the plane in which said disk is disposed to engage said disk to restrain rotation of said disk upon electrical energization of said coil.

6. A seat belt retractor as set forth in claim 1 wherein said locking means includes a ratchet wheel connected to and rotatable with said spool and an actuatable pawl pivotably supported for engaging said ratchet wheel to lock said spool from rotation in the unwinding direction 7. A seat belt retractor as set forth in claim 6 further including lever means for pivoting said pawl into engagement with said ratchet wheel in response to restraining the rotation of said member.

8. An apparatus comprising:
a member rotatable about an axis;
means actuated in response to slowing of the rotation of said member;
an electromagnet having opposite poles fixed against rotation and extending adjacent to the periphery of said member;
means for supporting said poles for movement relative to said member; and
means for energizing said electromagnet to create a magnetic field extending through said poles and said member to cause said poles to be attracted against said member to slow the rotation of said member.

9. An apparatus as set forth in claim 8 further including a rotatable seat belt retractor spool, said member being rotatable in response to rotation of the spool and rotatable relative to said spool upon slowing of said member, and means for locking said spool against rotation upon a predetermined amount of relative rotation between said member and said spool.

10. An apparatus as set forth in claim 8 wherein said member is formed of a material having a relatively high magnetic permeability comprises a disk having a circular peripheral surface against which said poles are attracted, said disk lying in a plane which is transverse to the axis of rotation of said member.

11. An apparatus as set forth in claim 8 wherein said electromagnet includes an electrically energizeable coil, said means supporting said poles for movement includes surface means defining an opening through said coil, and a core disposed in the opening through said coil, one of said poles being connected with a first axial end portion of said core and another of said poles being connected with a second axially opposite end portion of said core.

12. An apparatus as set forth in claim 11 wherein said core is movable within the opening through said coil, and said poles are constrained to move in a path in the plane in which said disk is disposed to engage said disk upon electrical energization of said coil.

13. A seat belt retractor comprising:
a spool rotatable in seat belt winding and unwinding drections;
a disk member rotatable with said spool at spool accelerations below a predetermined level and rotatable relative to said spool at spool accelerations above the predetermined level, said disk member being made of a material having a high magnetic permeability.
locking means for locking said spool against rotation in the unwinding direction in response to relative rotation of said disk member and said spool; and
means for restraining rotation of said disk member to effect relative rotation of said disk member and said spool comprising
an electric coil which is energized in response to a predetermined condition for creating a magnetic field through said disk member, and
at least one member disposed adjacent said disk member and movable in response to energization of said coil by the magnetic force created between the disc member at the least one member into frictional engagement with said disk member to restrain the rotation of said disk member to effect relative rotation of said disk member and said spool.

14. A seat belt retractor as set forth in claim 14 wherein said locking means includes a ratchet wheel connected to and rotatable with said spool and a pawl movably supported for engaging said ratchet wheel to lock said spool from rotation in the belt unwinding direction.

15. A seat belt retractor as set forth in claim 14 further including lever means for pivoting said pawl into engagement with said ratchet wheel in response to relative rotation of said disk member and said spool.

16. A seat belt retractor as set forth in claim 13 wherein said one member is movable along a path in a plane containing said disk member.

17. A seat belt retractor as set forth in claim 13 wherein said electric coil has an opening therethrough, and said one member comprises a core disposed in said opening and movable transverse to the longitudinal extent of said opening.

18. A seat belt retractor as set forth in claim 13 wherein said electric coil and said one member are located beneath said disc member, said one member frictionally engaging said disc member upon energization of said electric coil to restrain rotation of said disc member to thereby provide for relative rotation of said disc member and said spool, and said one member dropping out of frictional engagement with said disc member upon de-energization of said electric coil to enable rotation of said disc member with said spool.

19. A seat belt retractor as set forth in claim 18 wherein said electric coil has an opening therethrough and said one member comprises a core, said opening having opposite upper and lower surfaces, the lower surface supporting said core, when said electric coil is not energized, said core being movable upward transverse to the longitudinal extent of said opening upon energization of said electric coil.

20. A seat belt retractor as set forth in claim 16 wherein said disc member has an outer circular circumference and said one member frictionally engages said outer circular circumference of said disc member.

21. A seat belt retractor as set forth in claim 20 wherein said coil member and said one member are located beneath said disc member and said one member drops out of frictional engagement with said disc member upon de-energization of said electric coil to enable rotation of said disc member with said spool.

* * * * *